(12) United States Patent
Zeng et al.

(10) Patent No.: US 10,338,440 B2
(45) Date of Patent: Jul. 2, 2019

(54) TFT SUBSTRATE AND MANUFACTURING METHOD THEREOF

(71) Applicant: Shenzhen China Star Optoelectronics Technology Co., Ltd., Shenzhen (CN)

(72) Inventors: Mian Zeng, Shenzhen (CN); Xiaodi Liu, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 39 days.

(21) Appl. No.: 15/539,698

(22) PCT Filed: May 18, 2017

(86) PCT No.: PCT/CN2017/084978
§ 371 (c)(1),
(2) Date: Jun. 26, 2017

(87) PCT Pub. No.: WO2018/188160
PCT Pub. Date: Oct. 18, 2018

(65) Prior Publication Data
US 2018/0292717 A1 Oct. 11, 2018

(30) Foreign Application Priority Data
Apr. 10, 2017 (CN) .......................... 2017 1 0229766

(51) Int. Cl.
*H01L 27/14* (2006.01)
*H01L 29/04* (2006.01)
(Continued)

(52) U.S. Cl.
CPC ...... *G02F 1/134309* (2013.01); *G02F 1/1368* (2013.01); *G02F 1/13439* (2013.01);
(Continued)

(58) Field of Classification Search
None
See application file for complete search history.

(56) References Cited

U.S. PATENT DOCUMENTS

| | | | | |
|---|---|---|---|---|
| 2011/0114955 A1* | 5/2011 | Chun | ................. | G02F 1/136213 257/59 |
| 2015/0362811 A1* | 12/2015 | Huang | ................. | H01L 27/1225 438/104 |
| 2016/0377895 A1* | 12/2016 | Liu | ....................... | G02F 1/1368 257/43 |

FOREIGN PATENT DOCUMENTS

| | | |
|---|---|---|
| CN | 1737673 A | 2/2006 |
| CN | 104914635 A | 9/2015 |

(Continued)

*Primary Examiner* — Calvin Y Choi
(74) *Attorney, Agent, or Firm* — Leong C. Lei

(57) ABSTRACT

The invention provides a TFT substrate and manufacturing method thereof. The TFT substrate comprises: base substrate, TFT layer, passivation layer and pixel electrode, stacked in above order; wherein the pixel electrode comprising: main electrode, and connection electrode connected to main electrode; the connection electrode connected to TFT layer through pixel electrode via; main electrode having a cross-like slit structure with branch electrode on four trunks of cross, and the connection electrode comprising a plurality of parallel stripe-shaped first branch electrodes, and a second branch electrode connected to the first branch electrodes; by disposing the first branch electrodes, the connection electrode having a shape similar to main electrode to make the main and connection electrodes having similar single slit diffraction when exposed to reduce or eliminate the photo-resist thickness difference in pixel electrode area in the 3M process to avoid display defect and improve yield rate.

13 Claims, 13 Drawing Sheets

(51) Int. Cl.
*H01L 29/15* (2006.01)
*H01L 31/036* (2006.01)
*G02F 1/1343* (2006.01)
*G02F 1/1368* (2006.01)
*G02F 1/1362* (2006.01)
*G02F 1/1337* (2006.01)

(52) U.S. Cl.
CPC .. *G02F 1/136286* (2013.01); *G02F 1/133707* (2013.01); *G02F 1/136227* (2013.01); *G02F 2001/134345* (2013.01); *G02F 2001/136236* (2013.01); *G02F 2201/122* (2013.01); *G02F 2201/123* (2013.01)

(56) References Cited

FOREIGN PATENT DOCUMENTS

| | | |
|---|---|---|
| CN | 106298646 A | 1/2017 |
| JP | 2000002885 A | 1/2000 |
| JP | 2004264652 A | 9/2004 |

\* cited by examiner

TFT SUBSTRATE AND MANUFACTURING METHOD THEREOF

BACKGROUND OF THE INVENTION

1. Field of the Invention

The present invention relates to the field of display, and in particular to a thin film transistor (TFT) substrate and manufacturing method thereof.

2. The Related Arts

As display technology progresses, the liquid crystal display (LCD) shows the advantages of high display quality, low power-consumption, thinness, and wide applications, the LCD is widely used in various devices, such as, liquid crystal TV, mobile phones, PDA, digital camera, PC monitors or notebook PC screens, becomes the leading display technology.

The LCD panel usually comprises a color filter (CF) substrate, a thin film transistor (TFT) substrate, a liquid crystal (LC) sandwiched between the C substrate and the TFT substrate, and a sealant; the LC molecules do not emit light, so the display panel requires a light source to display the image. The manufacturing process usually comprises: a frond-part array process (thin film, lithography, etching and peeling), a middle-part cell process (TFT substrate and CF substrate attachment), and a rear-part module assembly process (driver IC, printed circuit board (PCB) lamination); wherein the array process is mainly to form the TFT substrate to facilitate controlling the motion of the liquid crystal (LC) molecules; the cell process is mainly to add LC between the TFT substrate and CF substrate, and the module assembly process is mainly to laminate the driver IC and integrate the PCB so as to drive the LC molecules to rotate and display images.

The known TFT substrate manufacturing process evolves from the initial 7Mask (using 7 masks) to 4Mask technology. The four masks are used respectively for: patternizing gates, patternizing active layer and source/drain, pixel electrode vias, and patternizing pixel electrodes. In the meantime, to further reduce the process complexity for TFT substrate and shorten manufacturing time and improve production efficiency, 3Mask (3M) technology starts to be used in some production process. The 3M process for manufacturing TFT substrate usually comprises: using a first mask to patternize gates on the base substrate, and covering the gates and the base substrate with a gate insulation layer; using a second mask to simultaneously patternize an active layer and sources/drains, and covering the active layer and source/drain with a passivation layer; using a third mask to form pixel electrode vias on the passivation layer, and using an indium-tin-oxide (ITO) lift-off process to patternize pixel electrodes. Wherein, the second mask and the third mask are both gray tone masks (GTM), or half tone masks (HTM).

Specifically, the third mask process in the 3M process comprises: coating a photo-resist layer on the passivation layer, performing lithography exposure on the photo-resist layer through the third mask, removing all the photo-resist layer at the pixel electrode vias, removing partially the photo-resist layer at the area to be pixel electrodes; then, using etching to form pixel electrode vias, performing graying of photo-resist, removing residual photo-resist layer from the areas to be pixel electrodes, sputtering pixel electrode thin film, using ITO lift-off process to lift the residual photo-resist layer and residual pixel electrode thin film to form patternized pixel electrodes.

However, refer to FIG. 1. The pixel electrode in a known TFT substrate comprises: a main electrode 101, a connection electrode 102 connected to the main electrode 101 and drain 201 of the TFT; the connection electrode 102 being connected to the drain 201 of the TFT through a pixel electrode via 301. As shown in FIG. 1, the main electrode 101 is of a cross-like slit structure with branch electrodes (i.e., two branches forming a slit) on four trunks of the cross, and the connection electrode 102 is a wholesome (i.e., uninterrupted continuity) electrode in entirety. Therefore, when performing lithography exposure on the photo-resist layer, single slit diffraction may occur at the main electrode 101, leading to the residual photo-resist layer at the area to be connection electrode 102 after exposure with a thickness less than the thickness of the residual photo-resist layer at the area to be main electrode 101, resulting in that the residual photo-resist layer at the area to be connection electrode 102 prone to etched away during the subsequent pixel via etching process. As such, the area to be connection electrode 102 will lose protection of the photo-resist layer and leads to production defect.

SUMMARY OF THE INVENTION

The object of the present invention is to provide a TFT substrate, able to reduce or eliminate the thickness difference of the photo-resist layer in the area of pixel electrode during 3M process to avoid display defect and improve 3M process yield rate.

Another object of the present invention is to provide a manufacturing method of TFT substrate, able to reduce or eliminate the thickness difference of the photo-resist layer in the area of pixel electrode during 3M process to avoid display defect and improve 3M process yield rate.

To achieve the above object, the present invention provides a thin film transistor (TFT) substrate, comprising: a base substrate, a TFT layer disposed on the base substrate, a passivation layer disposed on the TFT layer, and a pixel electrode disposed on the passivation layer;

the pixel electrode comprising: a main electrode, and a connection electrode connected to the main electrode; the connection electrode being electrically connected to the TFT layer through a pixel electrode via penetrating the passivation layer; the main electrode having a cross-like slit structure with branch electrode (i.e., two branches forming slit) on four trunks of the cross, and the connection electrode comprising a plurality of first branch electrodes of stripe shape arranged with intervals and in parallel, and a second branch electrode connected to the plurality of first branch electrodes.

According to a preferred embodiment of the present invention, the TFT layer comprises a gate disposed on the base substrate, a gate insulating layer covering the gate and the base substrate, an active layer disposed on the gate insulation layer above the gate, and a source and a drain disposed with interval on the gate insulation layer and connected respectively to two ends of the active layer; the connection electrode is connected to the drain through the pixel electrode via.

According to a preferred embodiment of the present invention, the second branch electrode is a stripe-shaped electrode connected to one end of each first branch electrode.

According to a preferred embodiment of the present invention, the second branch electrode is a frame-shaped electrode surrounding all the first branch electrodes.

According to a preferred embodiment of the present invention, the pixel electrode is made of indium-tin-oxide (ITO).

The present invention also provides a manufacturing method of thin film transistor (TFT) substrate, comprising:

Step 1: providing a base substrate, using a first mask process and a second mask process to form a TFT layer on the base substrate, and covering the TFT layer with a passivation layer;

Step 2: forming a photo-resist layer on the passivation layer, using a third mask process for patternizing the photo-resist layer, removing all the photo-resist layer at the area to be pixel electrode via, thinning the photo-resist layer at the areas to be pixel electrode;

Step 3: using the remaining photo-resist layer as a shield to etch the passivation layer to form a pixel electrode via penetrating the passivation layer and exposing the TFT layer;

Step 4: performing an overall thinning processing on the remaining photo-resist layer to remove the photo-resist layer at the areas to be pixel electrode;

Step 5: forming a pixel electrode thin film on the remaining photo-resist layer and the passivation layer, using a lift-off process to lift off the remaining photo-resist layer and the pixel electrode thin film on the remaining photo-resist layer to form a pixel electrode;

wherein the pixel electrode comprising: a main electrode, and a connection electrode connected to the main electrode; the connection electrode being electrically connected to the TFT layer through the pixel electrode via; the main electrode having a cross-like slit structure with branch electrode (i.e., two branches forming slit) on four trunks of the cross, and the connection electrode comprising a plurality of first branch electrodes of stripe shape arranged with intervals and in parallel, and a second branch electrode connected to the plurality of first branch electrodes.

Specifically, Step 1 comprises:

Step 11: providing a base substrate, forming a first metal layer on the base substrate, using a first mask process for patternizing the first metal layer to from a gate;

Step 12: covering the gate and the base substrate with a gate insulation layer;

Step 13: forming in stack of a semiconductor layer and a second metal layer on the gate insulation layer;

Step 14: coating a photo-resist on the second metal layer, using a second mask process for patternizing the photo-resist, thinning the photo-resist at the areas to be channel of the TFT, and removing photo-resist at the areas other than the TFT;

Step 15: performing a first etching to remove the second metal layer and semiconductor layer not covered with the photo-resist;

Step 16: performing a thinning process on the remaining photo-resist to remove the photo-resist at the areas to be channel of TFT;

Step 17: performing a second etching to remove the second metal layer at the areas to be channel of TFT, forming an active layer, and a source and a drain contacting two ends of the active layer to obtain the TFT layer;

Step 18: covering the TFT layer with a passivation layer;

in Step 3: the pixel electrode via exposing a part of the drain;

in Step 5: the connection electrode being electrically connected to the drain through the pixel electrode via;

in Step 1 and Step 2: the second mask and the third mask being both gray tone masks or half tone masks.

According to a preferred embodiment of the present invention, the second branch electrode is a stripe-shaped electrode connected to one end of each first branch electrode.

According to a preferred embodiment of the present invention, the second branch electrode is a frame-shaped electrode surrounding all the first branch electrodes.

According to a preferred embodiment of the present invention, the pixel electrode is made of indium-tin-oxide (ITO).

The present invention further provides a thin film transistor (TFT) substrate, comprising: a base substrate, a TFT layer disposed on the base substrate, a passivation layer disposed on the TFT layer, and a pixel electrode disposed on the passivation layer;

the pixel electrode comprising: a main electrode, and a connection electrode connected to the main electrode; the connection electrode being electrically connected to the TFT layer through a pixel electrode via penetrating the passivation layer; the main electrode having a cross-like slit structure with branch electrode (i.e., two branches forming slit) on four trunks of the cross, and the connection electrode comprising a plurality of first branch electrodes of stripe shape arranged with intervals and in parallel, and a second branch electrode connected to the plurality of first branch electrodes.

wherein the TFT layer comprising: a gate disposed on the base substrate, a gate insulating layer covering the gate and the base substrate, an active layer disposed on the gate insulation layer above the gate, and a source and a drain disposed with interval on the gate insulation layer and connected respectively to two ends of the active layer; the connection electrode being connected to the drain through the pixel electrode via;

wherein, the pixel electrode being made of indium-tin-oxide (ITO).

Compared to the known techniques, the present invention provides the following advantages: the present invention provides a TFT substrate, comprising: base substrate, TFT layer, passivation layer and pixel electrode, all stacked in the above order; wherein the pixel electrode comprising: a main electrode, and a connection electrode connected to the main electrode; the connection electrode being electrically connected to the TFT layer through the pixel electrode via; the main electrode having a cross-like slit structure with branch electrode on four trunks of the cross, and the connection electrode comprising a plurality of first branch electrodes of stripe shape arranged with intervals and in parallel, and a second branch electrode connected to the plurality of first branch electrodes; by disposing a plurality of first branch electrodes, the connection electrode having a shape similar to the main electrode to make the main and connection electrodes having similar single slit diffraction when exposed to reduce or eliminate the photo-resist thickness difference in pixel electrode area in the 3M process to avoid display defect and improve yield rate. The present invention also provides a manufacturing method of TFT substrate, able to reduce or eliminate the photo-resist thickness difference in pixel electrode area in the 3M process to avoid display defect and improve yield rate.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 14:
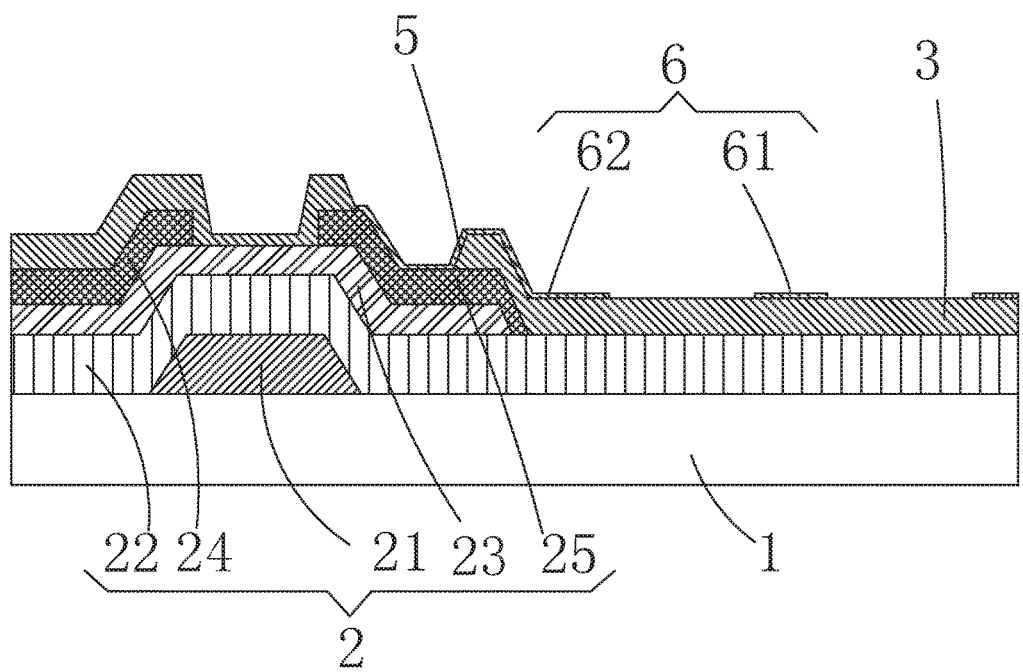
Figure 15:
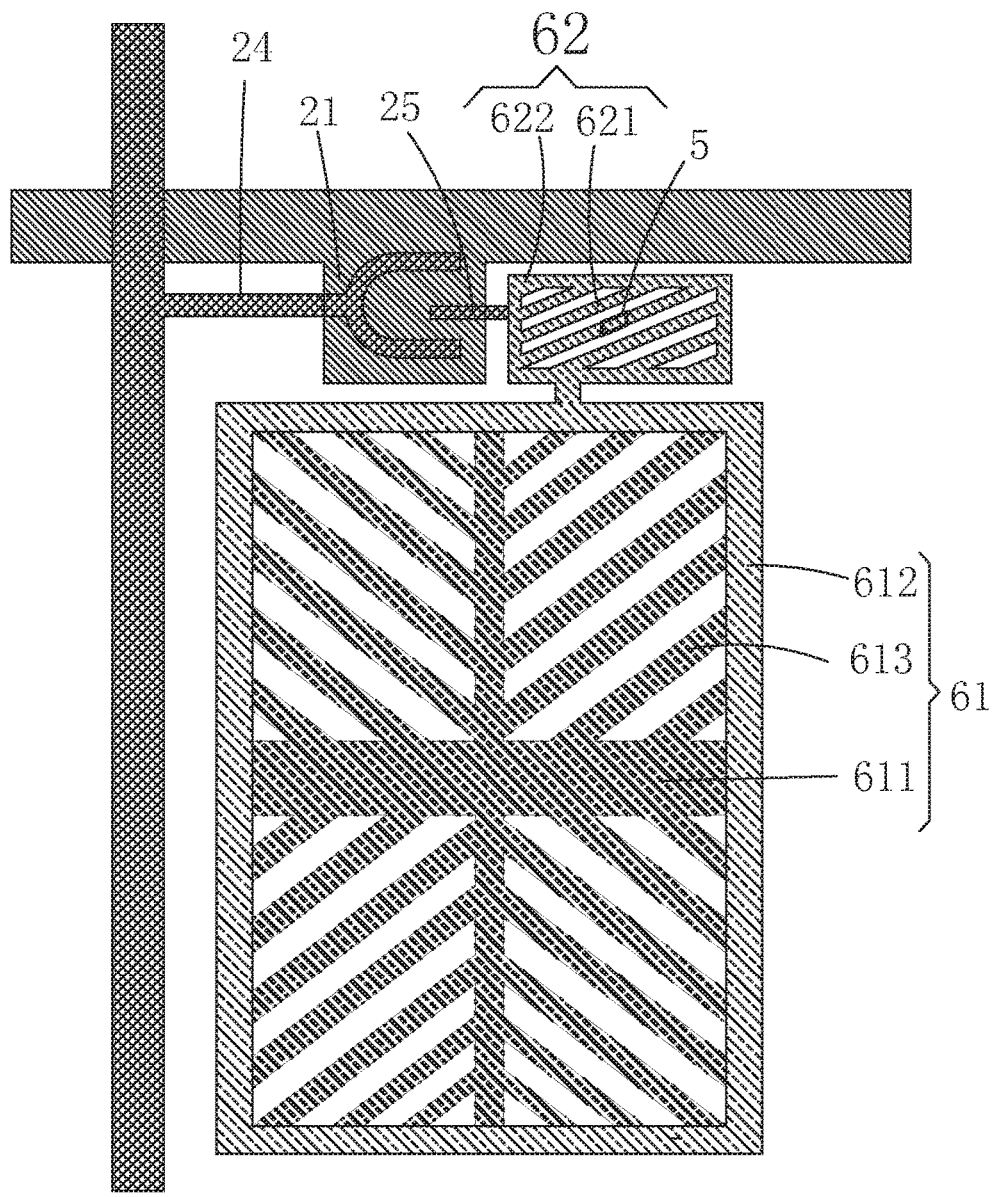
FIG. 15 is a schematic top view showing the first embodiment of TFT substrate according to the present invention.
Figure 16:
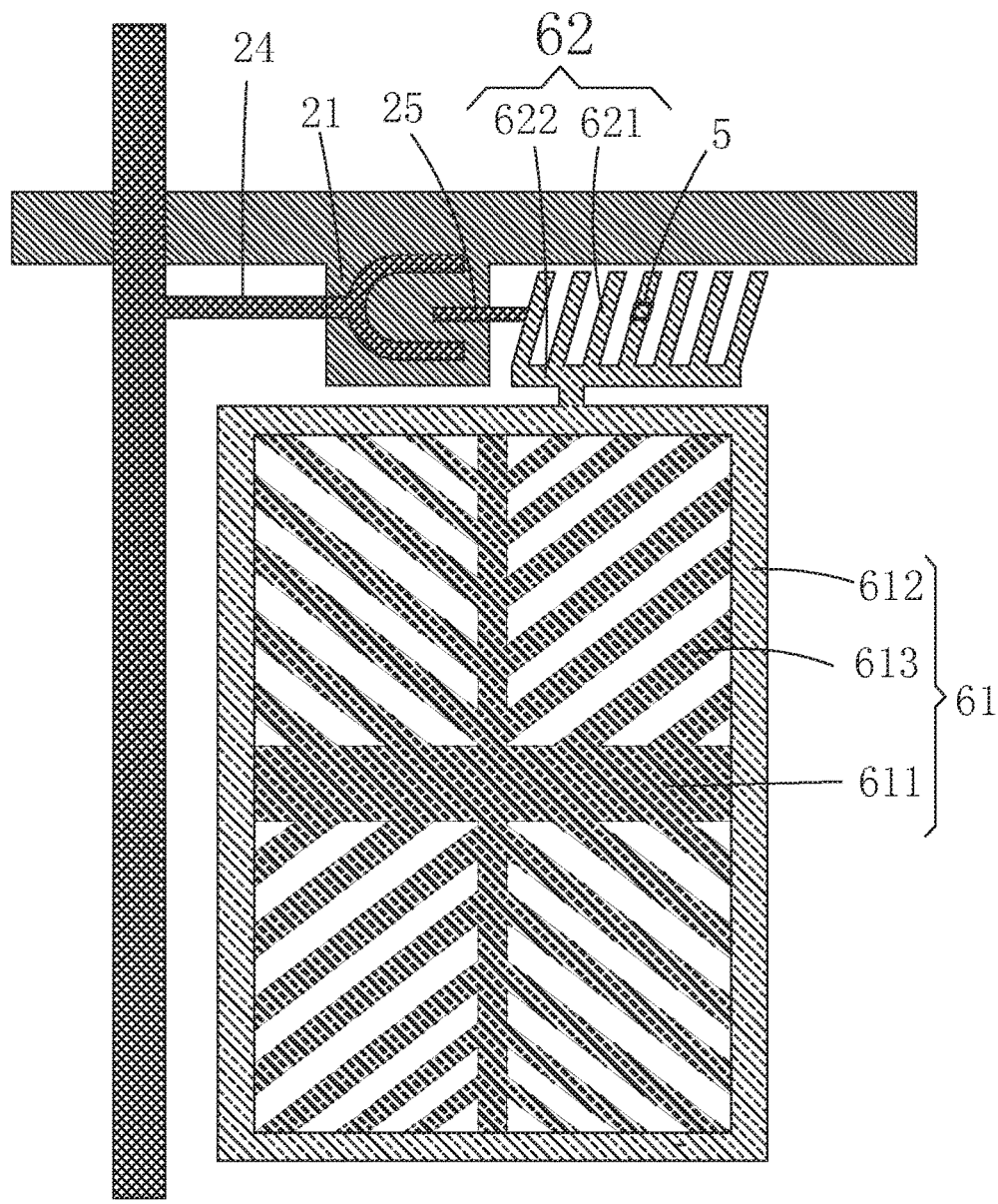
FIG. 16 is a schematic top view showing the second embodiment of TFT substrate according to the present invention.

Refer to FIG. 14, in combination with FIG. 15 and FIG. 16. the present invention provides a thin film transistor (TFT) substrate, comprising: a base substrate 1, a TFT layer 2 disposed on the base substrate 1, a passivation layer 3 disposed on the TFT layer 2, and a pixel electrode 6 disposed on the passivation layer 3;

the pixel electrode 6 comprising: a main electrode 61, and a connection electrode 62 connected to the main electrode 61; the connection electrode 62 being electrically connected to the TFT layer 2 through a pixel electrode via 5 penetrating the passivation layer 3; the main electrode 61 having a cross-like slit structure with branch electrode (i.e., two branches forming a slit) on four trunks of the cross, and the connection electrode 62 comprising a plurality of first branch electrodes 621 of stripe shape arranged with intervals and in parallel, and a second branch electrode 622 connected to the plurality of first branch electrodes 621.

Specifically, as shown in FIG. 14, the TFT layer 2 comprises a gate 21 disposed on the base substrate 1, a gate insulating layer 22 covering the gate 21 and the base substrate 1, an active layer 23 disposed on the gate insulation layer 22 above the gate 21, and a source 24 and a drain 25 disposed with interval on the gate insulation layer 22 and connected respectively to two ends of the active layer 23; the connection electrode 62 is connected to the drain 25 through the pixel electrode via 5.

Preferably, as shown in FIG. 15, in the first embodiment of the present invention, the second branch electrode 622 is a frame-shaped electrode surrounding all the first branch electrodes 621. Preferably, as shown in FIG. 16, the second branch electrode 622 is a stripe-shaped electrode connected to one end of each first branch electrode 621. It should be noted that the second branch electrode 622 can also have other shapes as long as able to electrically connect the plurality of first branch electrodes 621.

Specifically, the pixel electrode 6 is made of indium-tin-oxide (ITO). Preferably, the gate 21, source 24 and drain 25 are made of a combination of one or more metals, such as, aluminum, molybdenum, and copper; the material of the gate insulating layer 22 and the passivation layer 3 is one of silicon oxide (SiOx) and silicon nitride (SiNx) or a combination of both.

Specifically, the cross-like slit electrode usually comprises: a cross-shape trunk electrode 611, a border electrode 612 surrounding the trunk electrode 611; the border electrode 612 and the trunk electrode 611 defining four domains, with each domain comprising a plurality of stripe-shaped pixel electrode branches 613 extending in four different directions and a slit formed between two pixel electrode branches 613. Preferably, the pixel electrode branches 613 in two adjacent domains are symmetrical with respect to the trunk electrode 611. The cross-like slit electrode structure divides a sub-pixel into a plurality of domains. By making the LC in each domain to lean towards different direction after applying voltage, the viewing from various directions will approximate average and consistency to improve the color shift in LCD and increase the viewing angle of the LCD. It should be noted that the cross-like slit electrode can also have other designs, such as, eliminating the border electrode 612, as long as the structure comprises pixel electrode branches 613 extending in four different directions and forming a slit between two adjacent pixel electrode branches 613.

Specifically, the widths of the connection electrode 62 and the first branch electrode 621 and the gap between two adjacent first branch electrode 621 can be adjusted in accordance with the specific photo-resist thickness difference between the areas to be the main electrode 61 and the connection electrode 62 in the present technology, to reduce the thickness difference as much as possible.

It should be noted that the TFT substrate can be manufactured by 3M process. Because the connection electrode 62 and the main electrode 61 have the similar slit structure, when using the third mask for patterning the photo-resist layer, similar single slit diffraction can be formed at areas to be the main electrode 61 and the connection electrode 62, so as to reduce the photo-resist layer thickness difference in the pixel electrode area in the 3M process to avoid display defect and improve yield rate.

Figure 17:
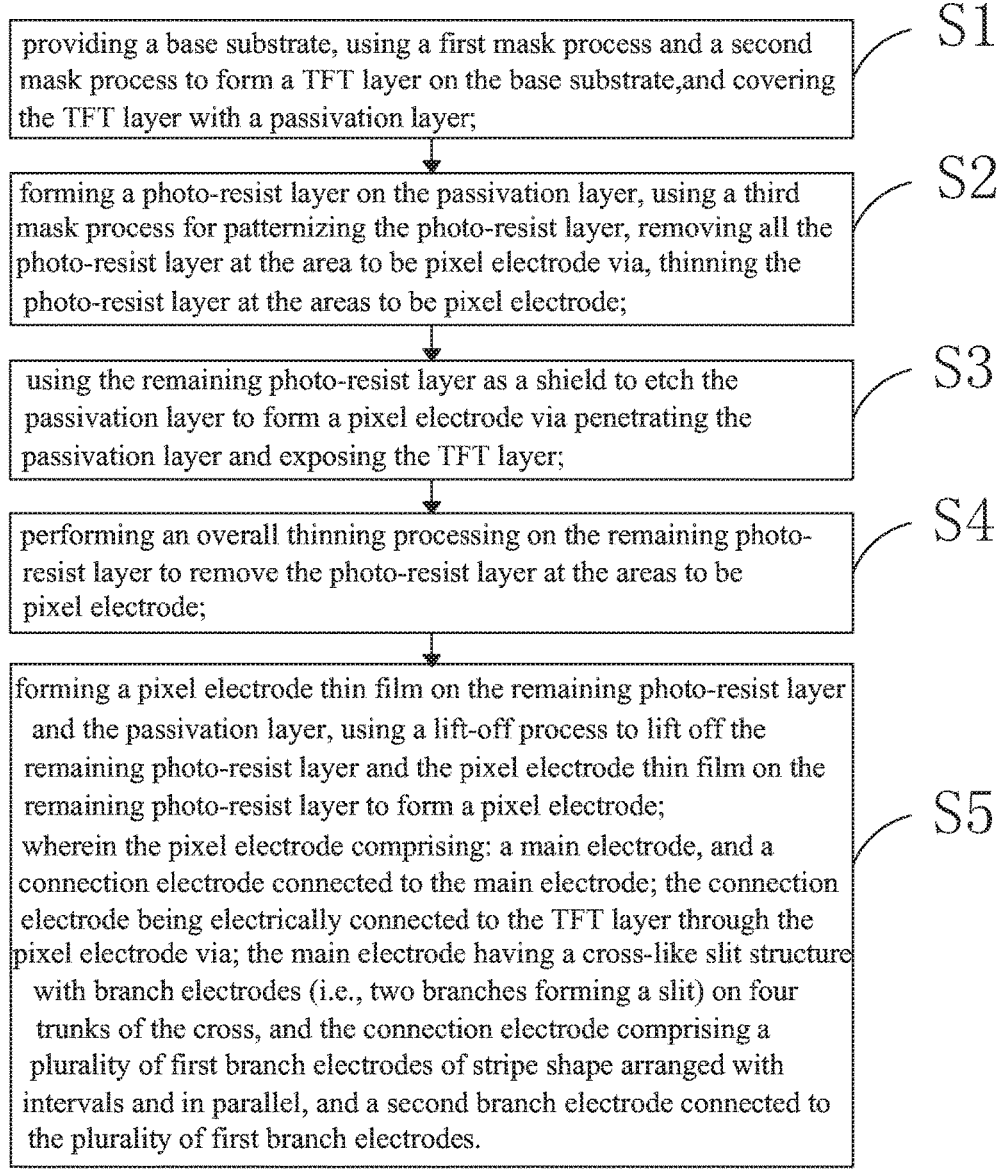
FIG. 17 is a schematic view showing the flowchart of the manufacturing method of TFT substrate according to the present invention.

Based on the aforementioned TFT substrate, referring to FIG. 17, the present invention also provides a manufacturing method of TFT substrate:

Step 1: referring to FIGS. 2-9, providing a base substrate 1, using a first mask process and a second mask process to form a TFT layer 2 on the base substrate 1, and covering the TFT layer 2 with a passivation layer 3.

Figure 1:
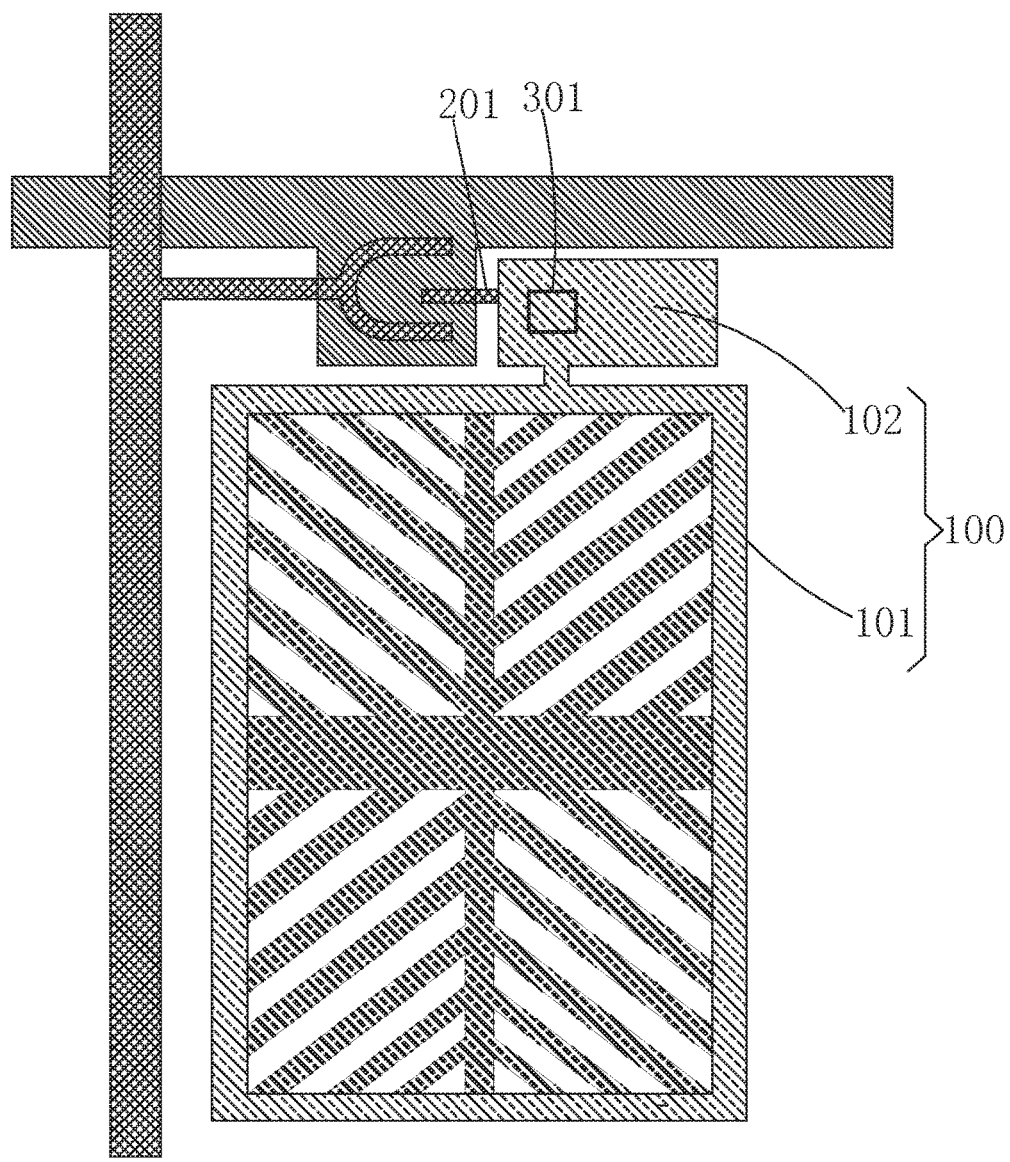
FIG. 1 is a schematic view showing the pixel electrode area of a known TFT substrate.
Figure 2:
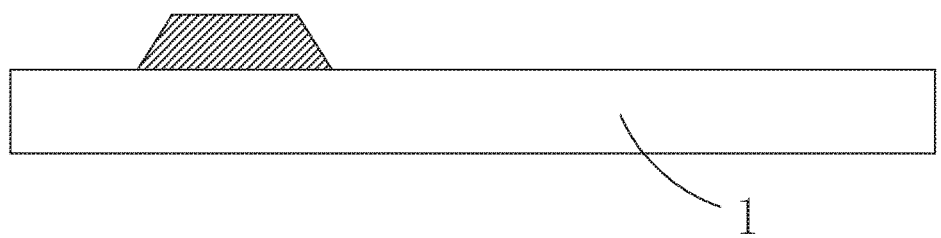
FIGS. 2-9 are schematic views showing Step 1 of the manufacturing method of TFT substrate according to the present invention.
Figure 3:
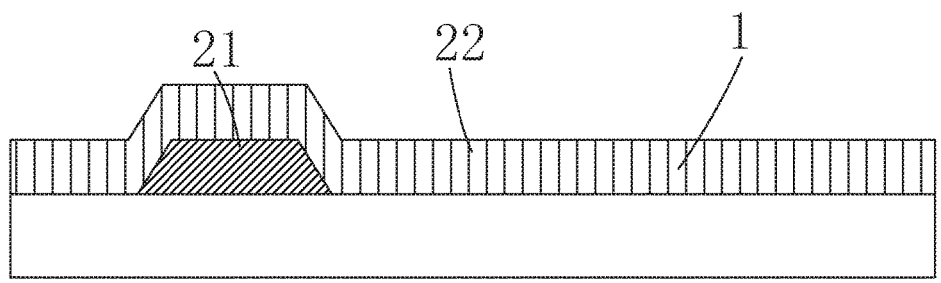
Figure 4:
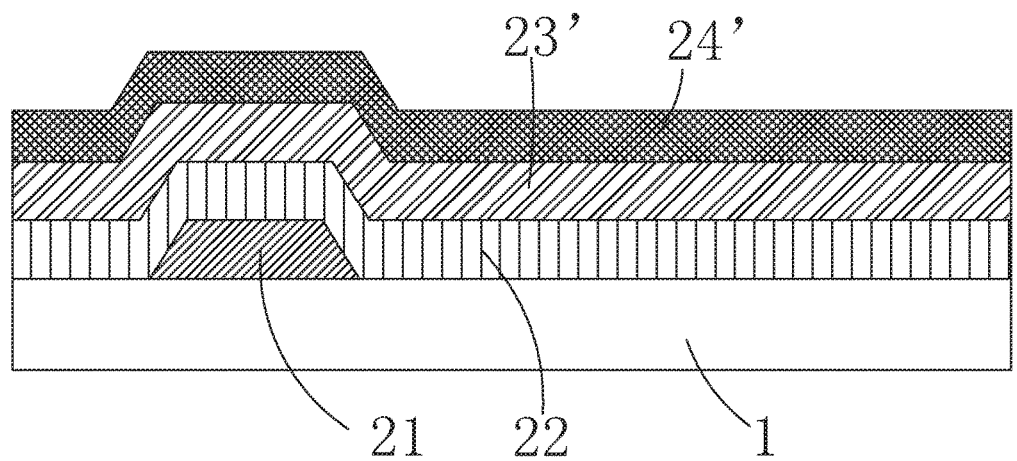
Figure 5:
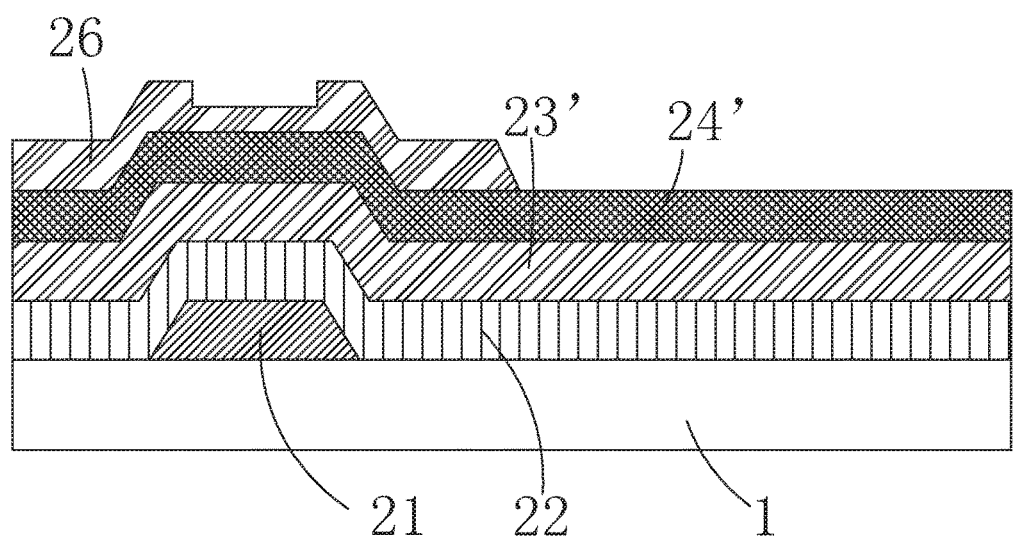
Figure 6:
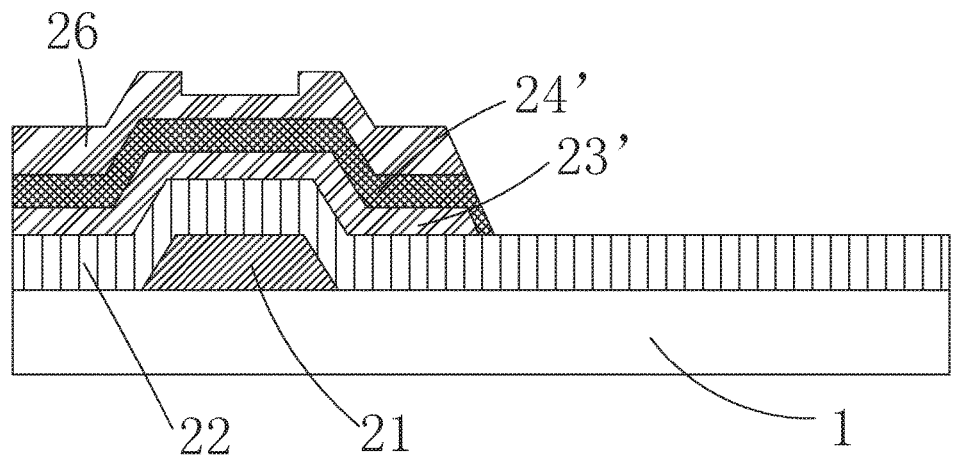
Figure 7:
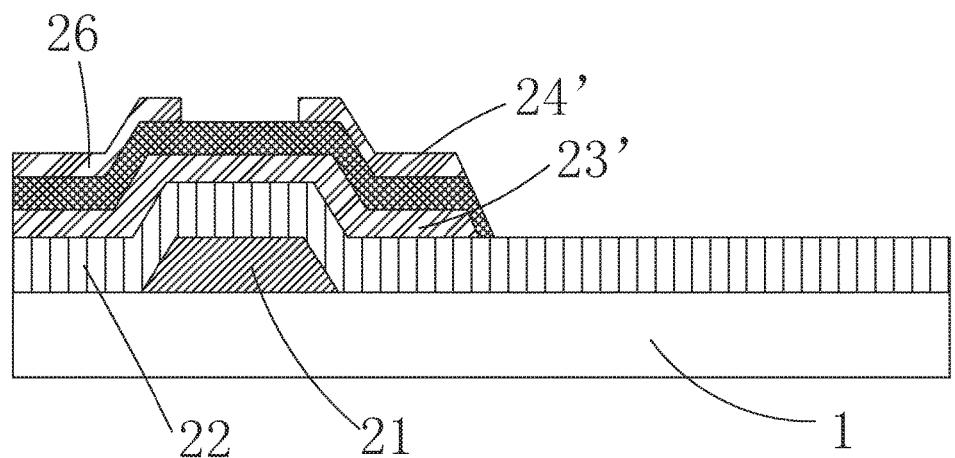
Figure 8:
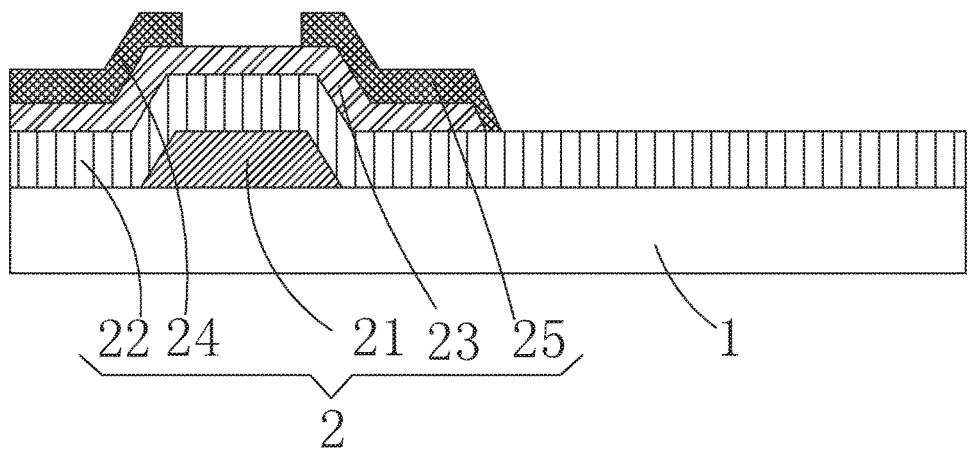
Figure 9:
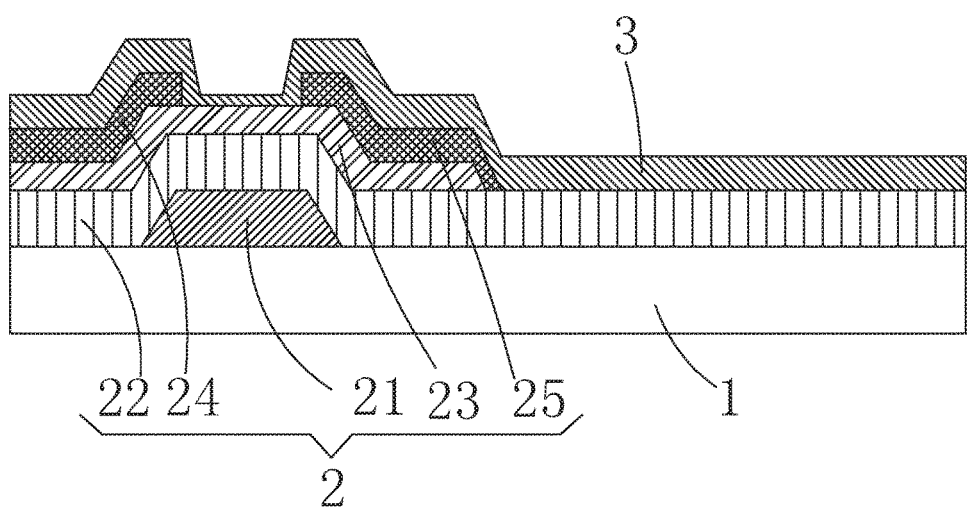

Specifically, Step 1 further comprises:

Step 11: referring to FIG. 2, providing a base substrate 1, forming a first metal layer on the base substrate 1, using a first mask process for patternizing the first metal layer to from a gate 21;

Step 12: referring to FIG. 3, covering the gate 21 and the base substrate 1 with a gate insulation layer 22;

Step 13: referring to FIG. 4, forming in stack of a semiconductor layer 23' and a second metal layer 24' on the gate insulation layer 22;

Step 14: referring to FIG. 5, coating a photo-resist 26 on the second metal layer 24', using a second mask process for patterning the photo-resist 26, thinning the photo-resist 26 at the areas to be channel of the TFT, and removing photo-resist 26 at the areas other than the TFT;

Step 15: referring to FIG. 6, performing a first etching to remove the second metal layer 24' and semiconductor layer 23' not covered with the photo-resist 26;

Step 16: referring to FIG. 7, performing a thinning process on the remaining photo-resist 26 to remove the photo-resist 26 at the areas to be channel of TFT;

Step 17: referring to FIG. 8, performing a second etching to remove the second metal layer 24' at the areas to be channel of TFT, forming an active layer 23, and a source 24 and a drain 25 contacting two ends of the active layer 23 to obtain the TFT layer 2;

Step 18: referring to FIG. 9, covering the TFT layer 2 with a passivation layer 3.

Preferably, the gate 21, source 24 and drain 25 are made of a combination of one or more of metals, such as, aluminum, molybdenum, and copper; the material of the gate insulating layer 22 and the passivation layer 3 is one of silicon oxide (SiOx) and silicon nitride (SiNx) or a combination of both.

The second mask is a half tone mask or gray tone mask.

Figure 10:
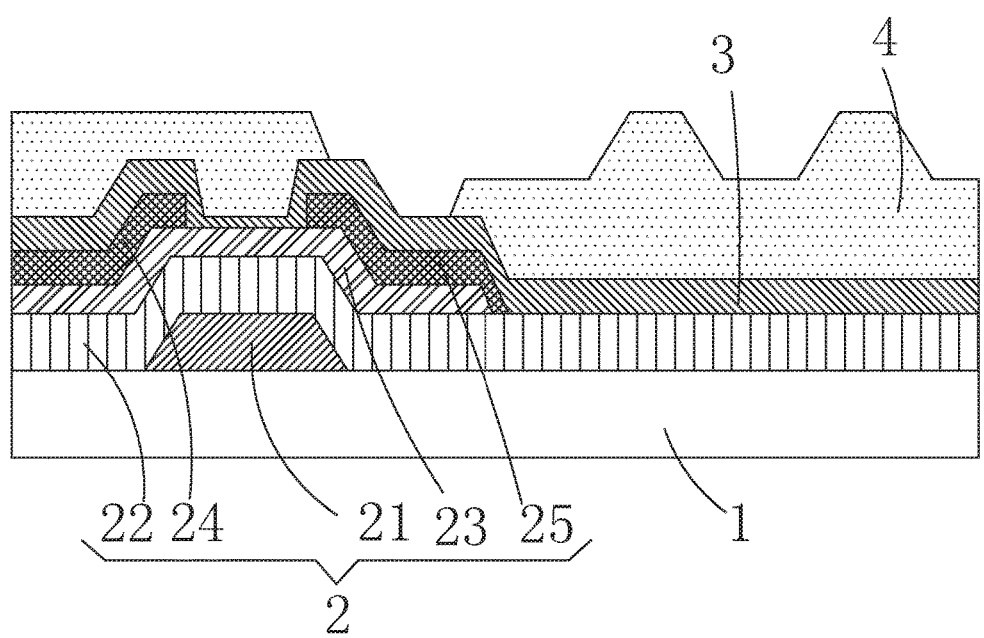
FIG. 10 is a schematic view showing Step 2 of the manufacturing method of TFT substrate according to the present invention.

Step 2: referring to FIG. 10, forming a photo-resist layer 4 on the passivation layer 3, using a third mask process for patterning the photo-resist layer 4, removing all the photo-resist layer 4 at the area to be pixel electrode via, thinning the photo-resist layer 4 at the areas to be pixel electrode.

Figure 11:
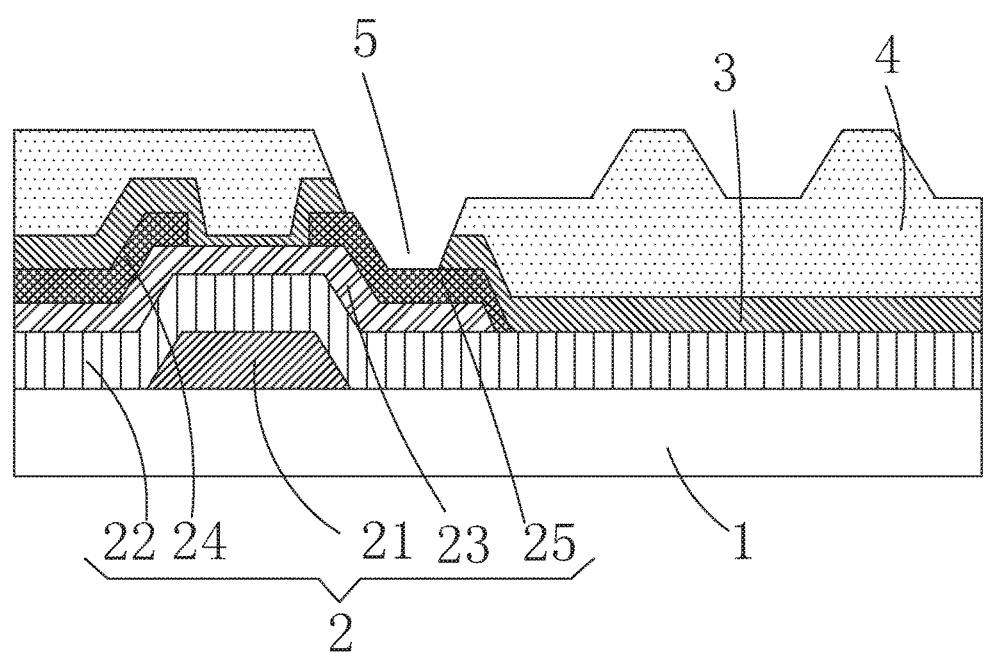
FIG. 11 is a schematic view showing Step 3 of the manufacturing method of TFT substrate according to the present invention.

Step 3: referring to FIG. 11, using the remaining photo-resist layer 4 as a shield to etch the passivation layer 3 to form a pixel electrode via 5 penetrating the passivation layer 3 and exposing the TFT layer 2.

Specifically, in Step 3, the pixel electrode via 5 exposing a part of the drain 25.

Figure 12:
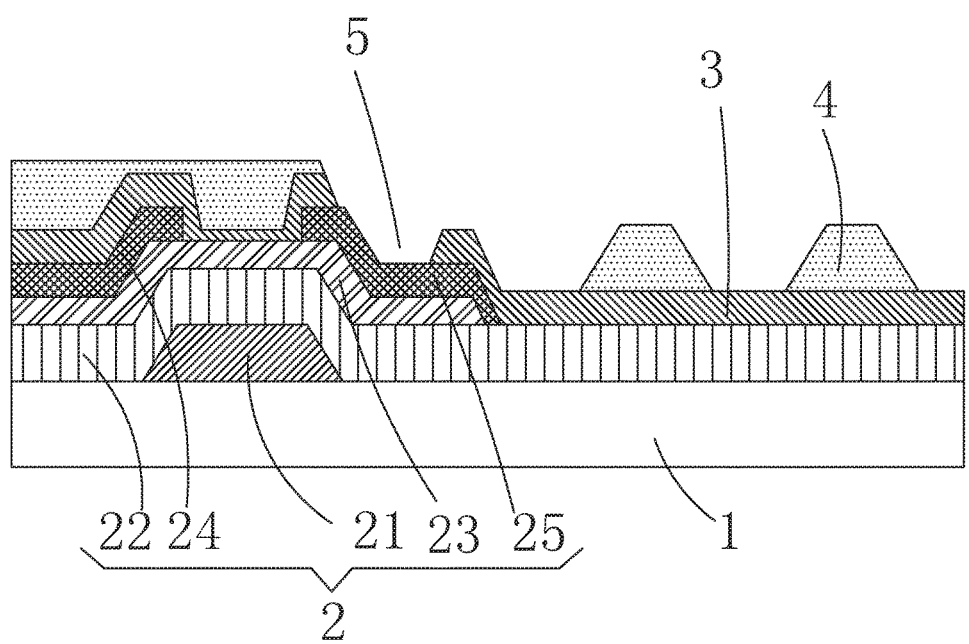
FIG. 12 is a schematic view showing Step 4 of the manufacturing method of TFT substrate according to the present invention.

Step 4: referring to FIG. 12, performing an overall thinning processing on the remaining photo-resist layer 4 to remove the photo-resist layer 4 at the areas to be pixel electrode.

Figure 13:
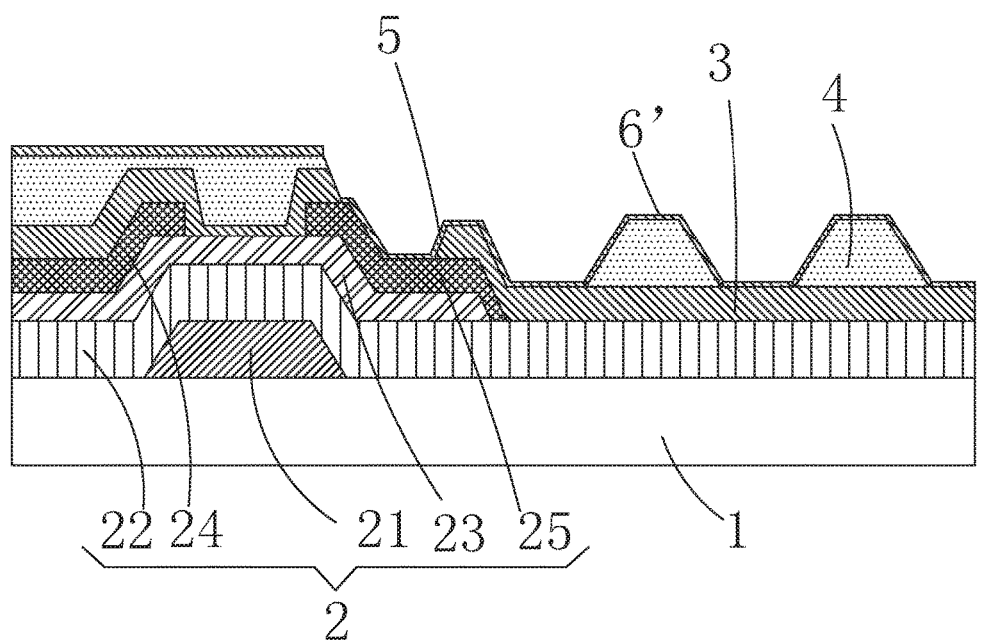
FIGS. 13-14 are schematic views showing Step 5 of the manufacturing method of TFT substrate according to the present invention.

Step 5: referring to FIG. 13, forming a pixel electrode thin film 6' on the remaining photo-resist layer 4 and the passivation layer 3, using a lift-off process to lift off the remaining photo-resist layer 4 and the pixel electrode thin film 6' on the remaining photo-resist layer 4 to form a pixel electrode 6;

Wherein, referring to FIG. 15 or FIG. 16, the pixel electrode 6 comprising: a main electrode 61, and a connection electrode 62 connected to the main electrode 61; the connection electrode 62 being electrically connected to the TFT layer 2 through the pixel electrode via 5; the main electrode 61 having a cross-like slit structure with branch electrode on four trunks of the cross, and the connection electrode 62 comprising a plurality of first branch electrodes 621 of stripe shape arranged with intervals and in parallel, and a second branch electrode 622 connected to the plurality of first branch electrodes 621.

Specifically, in Step 5, the connection electrode 61 is electrically connected to the drain 25 through the pixel electrode via 5.

Specifically, the pixel electrode is made of indium-tin-oxide (ITO). The lift-off process is an ITO lift-off process.

Preferably, as shown in FIG. 15, in the first embodiment of the present invention, the second branch electrode 622 is a frame-shaped electrode surrounding all the first branch electrodes 621. Preferably, as shown in FIG. 16, the second branch electrode 622 is a stripe-shaped electrode connected to one end of each first branch electrode 621. It should be noted that the second branch electrode 622 can also have other shapes as long as able to electrically connect the plurality of first branch electrodes 621.

Specifically, the cross-like slit electrode usually comprises: a cross-shape trunk electrode 611, a border electrode 612 surrounding the trunk electrode 611; the border electrode 612 and the trunk electrode 611 defining four domains, with each domain comprising a plurality of stripe-shaped pixel electrode branches 613 extending in four different directions and a slit formed between two pixel electrode branches 613. Preferably, the pixel electrode branches 613 in two adjacent domains are symmetrical with respect to the trunk electrode 611. The cross-like slit electrode structure divides a sub-pixel into a plurality of domains. By making the LC in each domain to lean towards different direction after applying voltage, the viewing from various directions will approximate average and consistency to improve the color shift in LCD and increase the viewing angle of the LCD. It should be noted that the cross-like slit electrode can also have other designs, such as, eliminating the border electrode 612, as long as the structure comprises pixel electrode branches 613 extending in four different directions and forming a slit between two adjacent pixel electrode branches 613.

Specifically, the widths of the connection electrode 62 and the first branch electrode 621 and the gap between two adjacent first branch electrode 621 can be adjusted in accordance with the specific photo-resist thickness difference between the areas to be the main electrode 61 and the connection electrode 62 in the present technology, to reduce the thickness difference as much as possible.

It should be noted that the TFT substrate can be manufactured by 3M process. Because the connection electrode 62 and the main electrode 61 have the similar slit structure, when using the third mask for patterning the photo-resist layer, similar single slit diffraction can be formed at areas to be the main electrode 61 and the connection electrode 62, so as to reduce the photo-resist layer thickness difference in the pixel electrode area in the 3M process to avoid display defect and improve yield rate.

In summary, the present invention provides a TFT substrate, comprising: base substrate, TFT layer, passivation layer and pixel electrode, all stacked in the above order; wherein the pixel electrode comprising: a main electrode, and a connection electrode connected to the main electrode; the connection electrode being electrically connected to the TFT layer through the pixel electrode via; the main electrode having a cross-like slit structure with branch electrode on four trunks of the cross, and the connection electrode comprising a plurality of first branch electrodes of stripe shape arranged with intervals and in parallel, and a second branch electrode connected to the plurality of first branch electrodes; by disposing a plurality of first branch electrodes, the connection electrode having a shape similar to the main electrode to make the main and connection electrodes having similar single slit diffraction when exposed to reduce or eliminate the photo-resist thickness difference in pixel electrode area in the 3M process to avoid display defect and improve yield rate. The present invention also provides a manufacturing method of TFT substrate, able to reduce or eliminate the photo-resist thickness difference in pixel electrode area in the 3M process to avoid display defect and improve yield rate.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A thin film transistor (TFT) substrate, comprising: a base substrate, a TFT layer disposed on the base substrate, a passivation layer disposed on the TFT layer, and a pixel electrode disposed on the passivation layer;
   the pixel electrode comprising: a main electrode, and a connection electrode connected to the main electrode; the connection electrode being electrically connected to the TFT layer through a pixel electrode via penetrating the passivation layer; the main electrode having a cross-like slit structure with branch electrodes defining the slits therebetween on four trunks of the cross, and the connection electrode comprising a plurality of first branch electrodes of stripe shape arranged with intervals and in parallel, and a second branch electrode connected to the plurality of first branch electrodes;
   wherein the plurality of first branch electrodes and the second branch electrode of the connection electrode electrically connects the main electrode of the pixel electrode to the TFT.

2. The TFT substrate as claimed in claim 1, wherein the TFT layer comprises a gate disposed on the base substrate, a gate insulating layer covering the gate and the base substrate, an active layer disposed on the gate insulation layer above the gate, and a source and a drain disposed with interval on the gate insulation layer and connected respectively to two ends of the active layer; the connection electrode is connected to the drain through the pixel electrode via.

3. The TFT substrate as claimed in claim 1, wherein the second branch electrode is a stripe-shaped electrode connected to one end of each first branch electrode.

4. The TFT substrate as claimed in claim 1, wherein the second branch electrode is a frame-shaped electrode surrounding all the first branch electrodes.

5. The TFT substrate as claimed in claim 1, wherein the pixel electrode is made of indium-tin-oxide (ITO).

6. A manufacturing method of thin film transistor (TFT) substrate, comprising:
   Step 1: providing a base substrate, using a first mask process and a second mask process to form a TFT layer on the base substrate, and covering the TFT layer with a passivation layer;
   Step 2: forming a photo-resist layer on the passivation layer, using a third mask process for patternizing the photo-resist layer, removing all the photo-resist layer at the area to be pixel electrode via, thinning the photo-resist layer at the areas to be pixel electrode;
   Step 3: using the remaining photo-resist layer as a shield to etch the passivation layer to form a pixel electrode via penetrating the passivation layer and exposing the TFT layer;
   Step 4: performing an overall thinning processing on the remaining photo-resist layer to remove the photo-resist layer at the areas to be pixel electrode;
   Step 5: forming a pixel electrode thin film on the remaining photo-resist layer and the passivation layer, using a lift-off process to lift off the remaining photo-resist layer and the pixel electrode thin film on the remaining photo-resist layer to form a pixel electrode;
   wherein the pixel electrode comprises a main electrode, and a connection electrode connected to the main electrode; the connection electrode being electrically connected to the TFT layer through the pixel electrode via; the main electrode having a cross-like slit structure with branch electrodes defining the slits therebetween on four trunks of the cross, and the connection electrode comprising a plurality of first branch electrodes of stripe shape arranged with intervals and in parallel, and a second branch electrode connected to the plurality of first branch electrodes;
   wherein the plurality of first branch electrodes and the second branch electrode of the connection electrode electrically connects the main electrode of the pixel electrode to the TFT.

7. The manufacturing method of TFT substrate as claimed in claim 6, wherein, Step 1 specifically comprises:
   Step 11: providing a base substrate, forming a first metal layer on the base substrate, using a first mask process for patternizing the first metal layer to from a gate;
   Step 12: covering the gate and the base substrate with a gate insulation layer;
   Step 13: forming in stack of a semiconductor layer and a second metal layer on the gate insulation layer;
   Step 14: coating a photo-resist on the second metal layer, using a second mask process for patternizing the photo-resist, thinning the photo-resist at the areas to be channel of the TFT, and removing photo-resist at the areas other than the TFT;
   Step 15: performing a first etching to remove the second metal layer and semiconductor layer not covered with the photo-resist;
   Step 16: performing a thinning process on the remaining photo-resist to remove the photo-resist at the areas to be channel of TFT;
   Step 17: performing a second etching to remove the second metal layer at the areas to be channel of TFT, forming an active layer, and a source and a drain contacting two ends of the active layer to obtain the TFT layer;
   Step 18: covering the TFT layer with a passivation layer;
   in Step 3: the pixel electrode via exposing a part of the drain;
   in Step 5: the connection electrode being electrically connected to the drain through the pixel electrode via;
   in Step 1 and Step 2: the second mask and the third mask being both gray tone masks or half tone masks.

8. The manufacturing method of TFT substrate as claimed in claim 6, wherein the second branch electrode is a stripe-shaped electrode connected to one end of each first branch electrode.

9. The manufacturing method of TFT substrate as claimed in claim 6, wherein the second branch electrode is a frame-shaped electrode surrounding all the first branch electrodes.

10. The manufacturing method of TFT substrate as claimed in claim 6, wherein the pixel electrode is made of indium-tin-oxide (ITO).

11. A thin film transistor (TFT) substrate, comprising: a base substrate, a TFT layer disposed on the base substrate, a passivation layer disposed on the TFT layer, and a pixel electrode disposed on the passivation layer;
    the pixel electrode comprising: a main electrode, and a connection electrode connected to the main electrode; the connection electrode being electrically connected to the TFT layer through a pixel electrode via penetrating the passivation layer; the main electrode having a cross-like slit structure with branch electrodes defining the slits therebetween on four trunks of the cross, and the connection electrode comprising a plurality of first branch electrodes of stripe shape arranged with intervals and in parallel, and a second branch electrode connected to the plurality of first branch electrodes;

wherein the plurality of first branch electrodes and the second branch electrode of the connection electrode electrically connects the main electrode of the pixel electrode to the TFT;

wherein the TFT layer comprises a gate disposed on the base substrate, a gate insulating layer covering the gate and the base substrate, an active layer disposed on the gate insulation layer above the gate, and a source and a drain disposed with interval on the gate insulation layer and connected respectively to two ends of the active layer; the connection electrode being connected to the drain through the pixel electrode via;

wherein the pixel electrode is made of indium-tin-oxide (ITO).

12. The TFT substrate as claimed in claim 11, wherein the second branch electrode is a stripe-shaped electrode connected to one end of each first branch electrode.

13. The TFT substrate as claimed in claim 11, wherein the second branch electrode is a frame-shaped electrode surrounding all the first branch electrodes.

* * * * *